United States Patent [19]

Jacobsen

[11] Patent Number: 4,485,134

[45] Date of Patent: * Nov. 27, 1984

[54] PLASTIC CONTAINERS FOR STORAGE OF GOODS UNDER PRESSURE

[75] Inventor: Kjell M. Jacobsen, Hjallese, Denmark

[73] Assignee: PLM Aktiebolag, Malmo, Sweden

[*] Notice: The portion of the term of this patent subsequent to Jun. 14, 2000 has been disclaimed.

[21] Appl. No.: 489,933

[22] Filed: Apr. 29, 1983

Related U.S. Application Data

[60] Continuation of Ser. No. 196,573, Oct. 14, 1980, Pat. No. 4,387,815, which is a division of Ser. No. 22,320, Mar. 20, 1979, Pat. No. 4,264,558, which is a continuation of Ser. No. 831,785, Sep. 9, 1977, abandoned, which is a continuation of Ser. No. 614,430, Sep. 18, 1975, abandoned.

[30] Foreign Application Priority Data

Sep. 24, 1974 [SE] Sweden .................................. 7411960

[51] Int. Cl.³ ............................................ B65D 23/00
[52] U.S. Cl. .......................................... 428/35; 215/16
[58] Field of Search ............................ 215/1 C; 428/35

[56] References Cited

U.S. PATENT DOCUMENTS

| | | | |
|---|---|---|---|
| 3,733,309 | 5/1973 | Wyeth et al. ........................ | 215/1 C |
| 3,934,743 | 1/1976 | McChesney et al. ................ | 215/1 C |
| 4,164,298 | 8/1979 | Mishikawa et al. ................. | 215/1 C |
| 4,233,022 | 11/1980 | Brady et al. ........................ | 215/1 C |
| 4,260,567 | 4/1981 | Poppe et al. ........................ | 215/1 C |
| 4,264,558 | 4/1981 | Jacobsen ............................. | 264/523 |
| 4,387,815 | 6/1983 | Jacobsen ............................. | 215/1 C |

FOREIGN PATENT DOCUMENTS 459272  3/1972  Japan .

OTHER PUBLICATIONS

Verpackung-Rundschay, May 1970, p. 718.

Primary Examiner—John E. Kittle
Attorney, Agent, or Firm—Roberts, Spiecens & Cohen

[57] ABSTRACT

A form-retaining container made of synthetic plastic material and apparatus for its manufacture in which a plastic material is fed in liquid state onto a male member to provide a layer on the male member constituting a blank for the container. The layer is cooled to prevent crystallization of the material. The thus cooled blank is placed into a mold cavity having an interior configuration corresponding to the desired outer shape of the container to be produced. The layer is inflated into conformity with the mold cavity. The configuration of the mold cavity is such that the blank undergoes biaxial stretching in a middle region of the container by at least 1.5 times while the mouth and part of the bottom of the container will be formed by biaxially stretching the blank less than 1.5 times. The inflated blank is then heated until curing is completed and then the blank is removed from the mold.

8 Claims, 3 Drawing Figures

PLASTIC CONTAINERS FOR STORAGE OF GOODS UNDER PRESSURE

CROSS-RELATED APPLICATION

This application is a continuation of Ser. No. 196,573 filed Oct. 14, 1980, now U.S. Pat, No. 4,387,815, which is a division of Ser. No. 22,320 filed Mar. 20, 1979 now issued as U.S. Pat. No. 4,264,558, which in turn is a continuation of Ser. No. 831,785 filed Sept. 9, 1977 (now abandoned) which in turn is a continuation of Ser. No. 614,430 filed Sept, 18, 1975 (now abandoned).

FIELD OF THE INVENTION

The present invention relates to thermostable plastic containers intended for storage over a certain period of time of goods under pressure, such as preserves, milk and milk-like products and the like and wherein containers can be reused a number of times. The invention also relates to apparatus for forming the containers.

PRIOR ART

For a long time, there has been a desire to achieve plastic containers suitable for the above-mentioned uses. Special containers for storage of goods under pressure are also known. As a rule, such known containers have a cylindrical form, which in turn involves that the bottom portion becomes particularly subjected to stresses, due to the internal excess pressure. In order to fulfill the requirements for strength at the bottom of the containers, a great number of bottom configurations have been developed. It is also known to work with reinforcements inserted into the region in question. Hitherto known solutions for achieving plastic containers for storage of goods under pressure show poor properties as regards the capability of retaining shape and strength, as they soften when heated. If such a container is used for storage of e.g. beer or beverages, the temperature sensitivity is, of course, a serious drawback, since heating of a liquid containing carbonic acid causes an increase of the pressure in the container, at the same time as the strength of the plastic walls of the container decreases.

It is sometimes required that containers for storage of preserves satisfy the requirement of being filled with hot goods. Furthermore, the containers must withstand the sterilizing required for the method of storage. For storage of milk or milk-like products, there is a requirement that the containers withstand the temperature at which pasteurization takes place.

With certain applications, the containers need to be filled with goods that have temperatures exceeding 100° C. For example, in medical applications autoclaving is used. In these applications, there also are severe requirements on the capability of the containers of withstanding high temperatures.

For containers of the type that are reused, it is required that they withstand the cleaning necessary for the repeated use, and the temperature and cleaning agents which are applied.

Containers made of thermoplastic material which are intended for the above-mentioned uses have hitherto been available only to a limited extent. In order to achieve the properties required to some extent, in principle, it has been attempted to obtain compositions of plastic material that are suitable for the special application, and attempts have also been made to give the containers such a shape that the strength of the material has been utilized as much as possible. The main problem is that the thermoplastics soften as the temperature increases, which has a detrimental effect on the strength of the containers. One means for achieving greater strength of the plastics used has been to stretch the material within the thermoelastic temperature range and then cool it, which results in a so-called biaxial orientation. There is also a risk that the container will change its shape at an increased temperature, due to the fact that the stresses that are built into the material in conjunction with the forming of the container are released at the higher temperature.

The properties of plastic containers which primarily have caused all attempts to find solutions are the low weight and the possibility of producing containers with better capability of withstanding impacts and shocks than that of conventional glass container.

Plastic material suitable for the above-mentioned purposes is more expensive per volume unit than glass. This has had a retarding effect on the possibilities of changing from containers made of glass to containers made of plastic. It has not been feasible to compensate the inferior temperature properties of the plastic container with an increased wall thickness of the container. Instead, for economic reasons, it has been necessary to have walls as thin as possible, and also to accept the drawbacks thereby involved.

Furthermore, no plastic material is known which is commercially suitable for use in containers intended for reuse, for the previously mentioned purposes, with the requirements such use involves.

SUMMARY OF THE INVENTION

According to the present invention, thermoplastic material in the form of a hollow member is treated so that the above-mentioned drawbacks of the thermoplastic material are eliminated and the above-mentioned applications for the plastic material can be permitted in general.

The invention discloses the possibility of shaping thermoplastic material into a hollow member so that it retains its shape permanently, and also retains its strength properties even if the hollow member is heated to very high temperatures. Practical tests have shown, for example, that a container, the wall of which consists of a thermoplastic material treated according to the invention, can be heated to 240° C. without the container changing shape. Furthermore, the material still has good strength at this temperature. Moreover, the material retains its good strength properties at low temperatures. The material can thereby be used for containers intended for storage of products which are kept in a frozen condition. In other tests, containers consisting of wall material treated according to the invention have been sterilized at 121° C. for an hour, and there have not been any changes in the shape of the container or any of its other properties. Furthermore, hot liquid at a temperature of 130° C. has been filled into containers made according to the invention, and this has not caused any change in shape or strength.

Material suitable for treatment according to the invention is crystallizable thermoplastic polymer plastic. In the following, the expression "crystallizable polymer plastics" refers to those synthetic, linear, organic polymer plastics that can be obtained in an essentially amorphous condition, and that can be transformed into a crystalline form through heating to temperatures above the melting point of the material, whereupon it is cooled slowly to room temperature. The substantially amorphous material is obtained by a rapid cooling of the melted polymer plastic. Crystallizable polymer plastics suitable for use in the manufacture of hollow members according to the invention are polyethlene terephthalate, polyhexamethylene adipamide, polycaprolactam, polyhexamethylene sebacamide, polyethylene 2,6 and 1,5 naphthalate,polytetramethylene-1,2-dioxybenzoate, and copolymers of ethyelen-terephthalate and ethylene isophthalate, and other similar polymer plastics. The invention is described with reference to a polymer plastic designated Akzo polyester Arnite 210, but the invention is applicable generally to crystallizable polymer plastics, of which examples are given above. The temperatures indicated in the following primarily refer to Akzo polyester Arnite 210.

The invention is based upon the fact that the above-mentioned materials can be treated so that they are in any one of five property ranges each of which is defined hereafter.

PROPERTY RANGE 1: CRYSTALLINE

In this property range the material is strong, hard, and has form stability, but is somewhat brittle. The uncolored material is milky white and opaque. Its properties are changed only to a slight degree with temperature, and measurements have shown that in the vicinity of the melting temperature of 255° C. the material substantially retains its above-mentioned properties. The material is transformed to the property range if, from a melted condition, it is allowed to cool without forced cooling. The material is then crystallized, and the clear or transparent appearance in the melted condition is changed to the above-mentioned milky white appearance. The material can also be transformed to this property range from property range 2, which is defined below. The procedure is then that the material, when it is in property range 2, is heated to a temperature exceeding approximately 100° C. and is held at this temperature for a certain time, and the material is then crystallized. At 140° C. the crystallization takes place very rapidly.

PROPERTY RANGE 2: AMORPHOUS

In this property range the material is somewhat less strong and hard and has somewhat less form stability than in property range 1. Instead, it is somewhat tougher. Further, it is clear and transparent. When heated, the material softens at approximately 70° C. and assumes a rubber-like character. It can be held at 100° C. for a long time without the material being changed, but if the temperature is raised further, the material begins to crystallize. Cf. property range 1, above. The material is transformed to this property range if it is rapidly cooled from the melted condition to a temperature of 100° C. or lower, the material then not having time to crystallize. Further, the material can be transformed into this property range from property range 3, which is defined below. This takes place if the material, when it is in property range 3, is heated to a temperature of 70° C. or higher, which temperature, however, must not exceed approximately 100° C.

PROPERTY RANGE 3: AMORPHOUS, ELASTIC AND STRETCHED

In this property range the material has the corresponding properties as when it is in property range 2, with the exception of its behavior at the heating to the temperature range between 70° and 100° C. The behavior of the material then will be described in the following. The material is transformed into this property range from property range 2 by heating the material when it is in property range 2 to a temperature of between 70° and 140° C., and while it is at this temperature it is stretched to a maximum of 1.3-1.5 times its original length. In the stretched condition, the material is then cooled to a temperature below 70° C. Internal stresses are then built into the material, which has the result that the material, when heated again to a temperature of between 70° and 140° C., returns to the length it had before the above-mentioned stretching took place.

From the description given above, it will also be noted that if the material, when it is in property range 3, is heated to 140° C. or more, for a sufficiently long time, the material will first be transformed into property range 2, as soon as the temperature passes 70° C., and thereafter into property range 1, when the crystallization commences, at a further increased temperature. If the heating takes place with the stretching of the material maintained, the crystallization will take place also in this case, and the material will then also be transformed into property range 1, but it will then retain its greater length.

PROPERTY RANGE 4

In this property range the material is entirely clear and transparent. It is very tough, and is moreover relatively strong and has relatively good form stability. The material retains its clearness even if it is heated to very high temperatures, even temperatures that are in the vicinity of the melting point of the material which, for the material in question, is 255° C. When the material is heated to temperatures above 70° C. a certain minor contraction of the material takes place, as the elastic stretching is released, but the plastic one remains.

The material is transformed into this property range by a procedure corresponding to the one for transforming the material into property range 3. From the beginning, it is thus to be in property range 2, and is heated to a temperature of between 70° and 140° C., after which it is stretched to more than 1.5 times its original length while it is still at the temperature to which it has been heated. Thereafter the material is cooled to a temperature of below 70° C., at the same time as it is still kept stretched. Certain internal stresses are thereby built into the material so that when the material is heated again to a temperature exceeding 70° C., it contracts somewhat. However, this contraction is less than the one corresponding to the previous stretching of the material.

PROPERTY RANGE 5

In this property range, the material has substantially the same properties as when it is in property range 4. Thus, it is entirely clear and transparent, very tough, relatively strong, and has relatively good form stability. Further to this, contrary to the case of when it is in property range 4, it retains its shape when heated, even if it is heated to a very high temperature, i.e. above 140° C.

The material is transformed into property range 5 from property range 4. This takes place by the material, when it is in property range 4, being heated for a sufficiently long time—in the order of seconds to minutes—to a temperature above 140° C., at the same time as the material is forced to retain its shape. The internal stresses which were built into the material at its orientation and which as regards the material in property range 4 result in a certain contraction of the material when it is heated to temperatures above 70° C. are then released.

As stated above, in order to transform the material into property range 3 or 4, certain stretching of the material must take place. At this stretching, the molecules of the material are oriented. It should be quite obvious that this stretching and orientation can be effected in more than one direction, whereby the orientation will be of a biaxial nature. Through the biaxial orientation, it is achieved that the strength of the material will be more independent of the direction in which the stressing takes place.

It is, of course, of great interest to be able to produce containers made of crystallizable polymer plastic, where the material of the containers is in property range 1 or in property range 5. The intention is then primarily that the bottom and mouth parts are in property range 1, while the material in the other parts of the container are in property range 5. If the procedure according to the invention is applied to a device for producing a bottle or crystallizable polymer plastic, a bottle is thus obtained in which, for example, the mouth part, the upper parts of the neck, and parts of the bottom section contain material which is in property range 1, while the other parts of the bottle are in property range 5. A bottle made in this way thus has a mouth with very good form stability, on which a cap can be fastened, a bottom with good form stability, very capable of withstanding internal overpressure without changing its shape, and at the same time the other parts of the bottle have great resistance to impacts and shocks. Further, a bottle formed in this way is substantially clear and transparent.

According to the invention, a container, for instance a bottle, is made in three steps. In the first step, a blank is formed in such a way that the material of the blank is in property range 2, in the second step the blank is widened to form a bottle, in which the cylindrical part of the bottle and sections of the neck and bottom are in property range 4, while the remaining parts of the bottle are in property range 2 or 3, and in the last step the parts of the bottle which previously were in property range 4 are transformed into property range 5, while the other parts of the bottle are transformed into property range 1. In this way a bottle is made which is built up in a way corresponding to the building up in principle which is described in the foregoing paragraph.

In practice, the blank can consist, for example, of an injection molded member or of an extruded tube which, upon manufacture, is cooled so rapidly that the material is in property range 2. In the second step the blank is transferred to a blow molding station, where the blank is expanded to the dimensions which the finished bottle is to have. The expansion takes place at a temperature of between 70° C. and 140° C. or, more generally speaking, at a temperature that is above the glass-transition temperature but below the crystallization temperature. Further, the blank has such dimensions that the cylindrical part of the bottle and parts of the neck and bottom regions will have their diameters increased at least 1.5 times. Thereafter, the bottle can either be transferred to a new station or remain in the station where it is. With an internal over-pressure in the bottle so that it is pressed against the walls of the mold used, the temperature of the material in the bottle is raised to above 140° C. or, more generally expressed, to above the temperature of maximal crystallization for such a long time that the stresses built into the material are released. The time required for this varies from seconds to minutes, depending on the temperature used and the material used. The parts of the material in the bottle that have been expanded at least 1.5 times have now been transformed into property range 5. The other parts of the bottle are in property range 1. In the final stage of the process, a temperature stabilization thus takes place. This need not be carried out in connection with the blow molding, but the molded bottles can very well be cooled down to room temperature, and on some later occasion be subjected to the temperature stabilization.

BRIEF DESCRIPTION OF THE DRAWINGS

The invention will be described in more detail with reference to the appended drawings, wherein.

DETAILED DESCRIPTION

Figure 1:
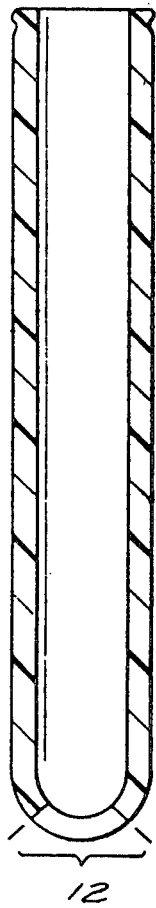
FIGS. 1 and 1A show respectively a blank and a finished bottle molded from the blank.
Figure 1A:
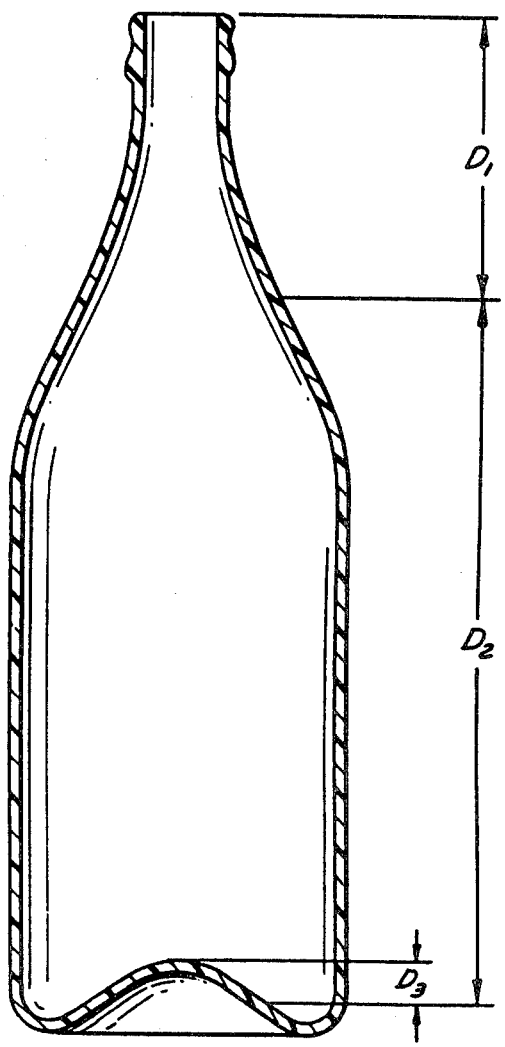

FIG. 1 show a blank 10, which is to be molded into a finished bottle 11. In the blank, a portion 12 in the bottom part is indicated, which can be in a crystallized form, i.e. in property range 1. In the finished bottle, three portions are indicated, namely portion $D_1$ comprising the mouth part and part of the neck, portion $D_2$ comprising the remaining part of the neck, the cylindrical part of the bottle and part of the bottom and, finally, portion $D_3$ comprising substantially the central portion of the bottom.

Figure 2:
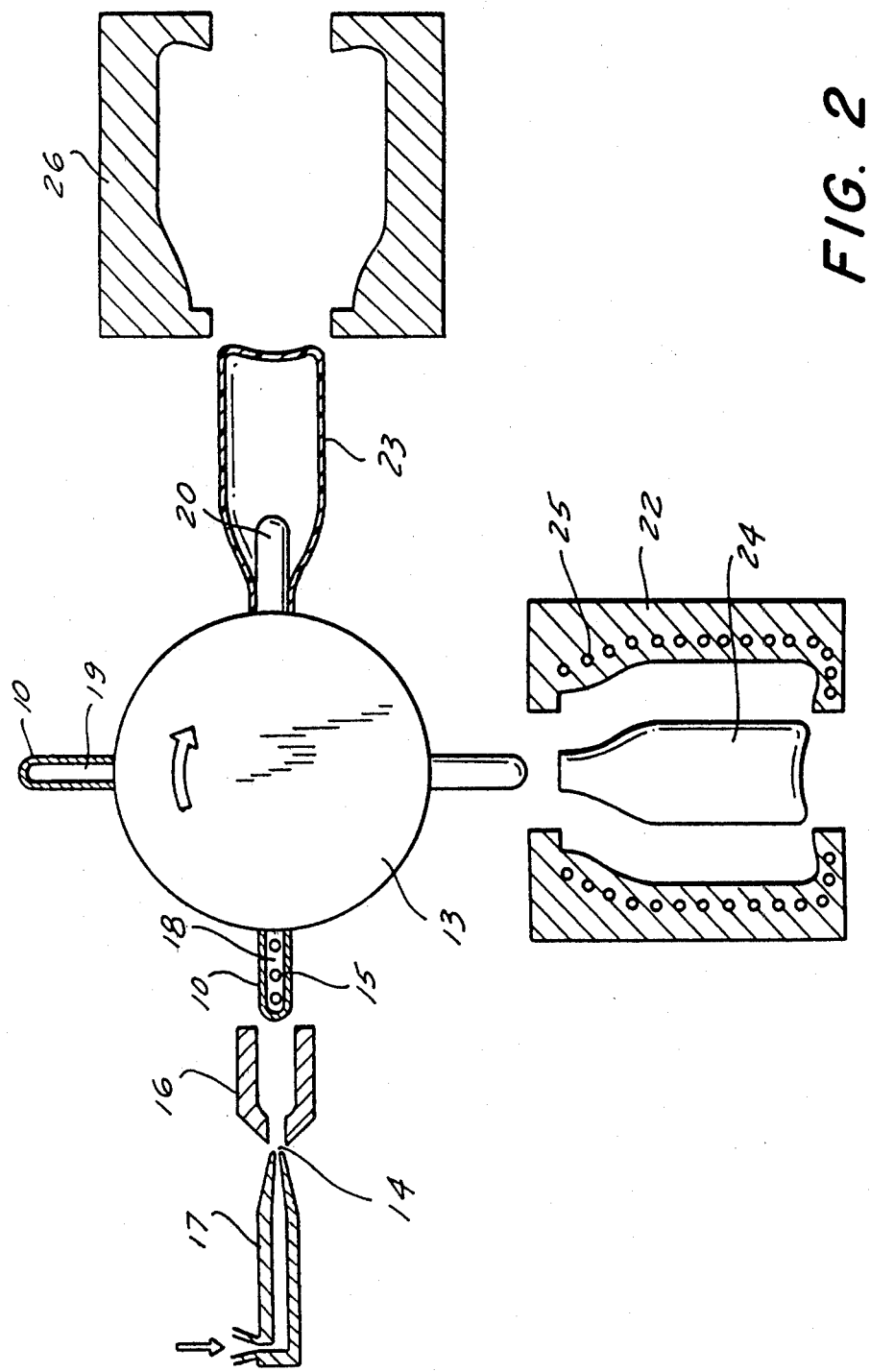
FIG. 2 diagrammatically shows a device for producing a bottle according to the invention.

FIG. 2 shows apparatus for producing the bottle comprising a wheel 13, which rotates in steps, on which four male parts 18, 19, 20, 21 are arranged. Each male part is provided with a number of tempering channels 15, through which tempering medium can flow. When a male part is in the position of the male part 18, the male part coacts with a blank-forming part 16 and an injection device 17 with a nozzle 14. When a male part is in the position of the male part 20, the male part coacts with a split mold 26, for forming the bottle, the inner surface of the mold corresponding to the form of the finished bottle. In the position of the male part 21, the male part coacts with a split outer mold 22 for the temperature stabilization or control of the bottle. The outer mold 22 for the temperature control is provided with channels or ducts 25 for tempering fluid. The valves that regulate the supply of the tempering fluid that flows through the channels of the male parts and through the channels of the outer molds, as well as other regulating and control devices, are not shown in the figure and they are conventional. The figure also shows a molded but not temperature-stabilized bottle 23 and a molded and temperature-stabilized bottle 24. The outer devices which coact with the male parts—blank forming part with injection device, the outer mold for forming the bottles and the outer mold for the thermostabilization—are shown in the position they have when the rotating wheel is to be moved one step.

The device operates in the following manner. Starting material in the form of crystallizable thermoplastic polymer plastic is fed to the injection device 17 in a solid or liquid form. Suitable and conventional devices open the nozzle 14 for an appropriate time interval, so that an appropriate quantity of plastic material is applied to the male part 18. This entire procedure takes place according to known technology. According to the invention, the plastic material, when it reaches the male part, is cooled so rapidly that the material does not crystallize, but is transformed into property range 2, previously described in this specification. If, in the following, it is assumed that the device is fed with the previously mentioned polymer plastic Akzo polyester 210, the plastic is cooled to a temperature of below 100° C. The blank is thereafter transferred to the next step of the rotating wheel, where it may possibly be tempered. Both in this position and in the foregoing one, the tempering of the blank takes place with the aid of the tempering channels 15. The male parts are moreover made of material with good heat conductivity.

When the temperature of the blank has reached the predetermined value, the wheel is rotated another step. The material of the blank then has a temperature of between 70° and 140° C. The male part 20, with the blank positioned on it, is now enclosed by the two halves of the outer mold 26 for the forming of the bottle, whereupon the blank is blown up against the inner walls of the mold. Depending on the stretching of the material, the plastic in the bottle will thereafter be in one of the property ranges 2, 3 or 4. At the contact against the outer mold, the material is cooled to a temperature of below 70° C., i.e. the temperature above which the orientation stresses in the material are released.

The molded but not temperature-stabilized bottle 23 is now transferred to the next station after the two halves of the outer mold have been opened and the rotating wheel rotated one step. The bottle is enclosed by the two halves of the mold for thermostabilization which are kept at an appropriate temperature by the tempering medium flowing through the channels for tempering fluid. The inner parts of the mold are made of a material that has good heat conductivity. The plastic material of the bottle is thereby kept at a temperature above 140° C., at the same time as the bottle is subjected to an internal pressure, pressing the walls of the bottle against the inner walls of the mold. The parts of the bottle which were previously in property range 4 are thereby transformed into property range 5. All other material crystallizes, and will thus, after the processing has been completed, be in property range 1. The time for which this processing must be carried out so that all of the material is transformed into property range 5 or 1 varies between seconds and minutes. The time depends upon the temperature used and on the plastic material used. When the procedure has been completed, the shape of the bottle conforms to the inner surface of the outer mold. The halves of the mold move aside, the bottle is blown loose from the male part, and leaves the molding device. The wheel is rotated another step, and the male part again comes into the position for receiving plastic material to form a new blank 10.

The sizes of the portions or regions $D_1$ and $D_3$ are determined by the stretching of the material that takes place in connection with the blowing of the blank into the form of a bottle. In both of these regions, the material is in property range 1 which requires that the stretching of the material is less than 1.5 times in connection with the blowing. It should thus be obvious that the sizes of the regions can be regulated by appropriate combinations of the shape of the blank and the shape of a finished bottle. It is thus possible to choose these two shapes in such a way that portions or regions will be partly or entirely eliminated. The reshaping from the blank into the bottle involves that the material is stretched in more than one direction, since, as a rule, the bottle is longer than the blank in the axial direction.

In portion or region $D_2$ the material is in property range 5, since the material, in connection with the reshaping of the blank, has been stretched at least 1.5 times.

It should be obvious that the blank need not have the substantially cylindrical form shown in FIG. 1. In order to achieve the special combinations of regions containing material within property range 1 and property range 5, respectively, which are desired in each individual production series, it may be necessary to give the blank a more irregular shape. If, for instance, it is desired that the finished bottle should have one or several rings of material which are in property range 1 in its cylindrical part, the blank should be made with corresponding cylindrical bulges, so that the material, when the blank is formed into a bottle, will be stretched to such a small extent—less than 1.5 times—that the material will be in property range 3. At the thermostabilization carried out in the final step, this material will crystallize and will be transformed into property range 1.

The material which is in property range 1 is crystallized and opaque, at the same time as it has a milky white appearance. This gives the bottle a characteristic appearance. As previously mentioned, bottles made according to the invention can be reused, since they will withstand the cleaning procedures required for their reuse. It has previously also been shown that the size of the milky white portion or region designated $D_1$ can be controlled through an adaptation of the diameter of the blank in relation to the corresponding diameters of the finished bottle. An esthetically attractive size of the milky white region can thus be obtained. At the same time, this milky white region can be allowed to constitute a readily identified indication that the bottle is intended for reuse.

In certain examples of the application it is desired that the bottom part has a flat section of material in property range 1. This makes said part of the bottom very rigid, and it will be more or less as though it had been provided with a reinforcement such as a piece of metal. The size of this rigid flat section can be controlled by means of appropriate combinations of the shape of the blank and the final shape of the bottle. According to another alternative for achieving this condition with a rigid section of the material which is in property range 1 and located in the bottom region of the bottle, the bottom part of the blank is allowed to cool so slowly that the material in the bottom part crystallizes. Cf. the crystallized range 12 shown in FIG. 1. In certain cases there can also be difficulties involved in achieving sufficiently efficient cooling in the vicinity of the nozzle of the injection device, and this leads to the crystallized region 12 shown in FIG. 1.

The production operation according to the invention also provides the possibility of providing a container with a wide opening, the mouth section of the container consisting of crystallized thermoplastic polymer plastic, i.e. of material which is in property range 1, as defined above. The other parts of the material in the container are in property range 5, possibly with the exception of certain parts of the bottom. In this way, a mouth part with form stability, well adapted to be closed, is obtained. The temperature stability of the mouth part also insures that the tightness of the closure, in principle, is not affected by temperature variations.

In the description above, it has been assumed that the temperature stabilization has been carried out in a special processing station. However, the temperature stabilization can, of course, also be carried out at the same station at which the reshaping of the blank to form a finished bottle takes place. The outer mold is then provided with channels for tempering, in the same way as indicated in the foregoing in regard to the outer mold for thermostabiliztion. In this way, the special thermostabilization station can be eliminated. The disadvantage of the alternative embodiment is that the production rate will be lower.

The temperature stabilization can also be carried out in special temperature stabilization machines. Already known and already installed machinery can thereby be used for the production of bottles according to the invention. The bottles made in such machines will thus contain wall material which is in one of the property ranges 2, 3 or 4, as in the case of the bottles which have not yet been temperature-stabilized in the device for the production of bottles which has previously been described in this specification.

The bottles which are produced in existing machinery and which thus have not been temperature-stabilized, are inserted in separate temperature-stabilization machines, in which, in the corresponding way as has been described previously, they are pressed against the walls of the molds in the temperature-stabilization machines, by means of an overpressure, at an appropriate temperature and for the time required.

It will hereby be found that the invention can be applied to existing machinery, utilizing its maximum production capacity. The temperature-stabilization is thereafter carried out in separate equipment, and the capacity of this equipment can then be adapted to the capacity of the existing machinery.

The description given above of an embodiment of the invention is only to be regarded as one example of the invention. Trials have shown that it has been easy to adapt machines of various known types to meet the special temperature requirements indicated for the production of containers according to the invention.

As previously mentioned, the above-mentioned temperature data refer to the polyester Akzo Arnite. For other cyrstallizable thermoplastic polymer plastics suitable for use in the manufacture of containers of the contemplated type, other temperatures may have to be employed. These embodiments are also included in the concept of the invention, as a variation of the temperatures in relation to what has been stated above merely involves the utilization of the materials within the corresponding property ranges as those indicated in the description and, accordingly, an application of the means for the production of containers within the contemplation of the invention.

Even after the temperature stabilization of the bottles according to the above-mentioned description has been carried out, the material in a bottle made according to the invention shows a certain tendency towards a minor contraction when the material in the bottle is heated anew. In principle, this tendency towards a slight shrinking can be eliminated if, when completing the temperature stabilization of each bottle, the internal excess pressure in the bottle is allowed to cease, at the same time as the bottle is allowed to remain in the heated mold for a certain length of time before it leaves the temperature stabilization station. During this time, the material in the walls of the bottle is still at an elevated temperature, but as the internal excess pressure in the bottle has ceased, the remaining shrinkage stresses in the material can be released, and thereby a slight shrinking of the bottle is released. When this has taken place, the bottle leaves the molding device in the usual way.

Whate is claimed is:

1. A form-retaining container made of a thermoplastic polymer material selected from the group consisting of polyethylene terephthalate, polyhexamethylene adipamide, polycaprolactam, polyhexamethylene sebacamide, polyethylene 2,6 and 1,5 naphthalate, polyetramethylene-1,2-dioxybenzoate, and copolymers of ethylene terephthalate and ethylene isophthalate; said container comprising in succession a mouth, a neck, a main body portion, and a bottom including a central portion and a peripheral portion, said container having a first region inclusive of said mouth and part of said neck, a second region inclusive of the remainder of said neck, said main body portion and said peripheral portion of said bottom, and a third region constituted by said central portion of said bottom, said polymer material being selectively heated, inflated and cooled so that said second region is obtained by stretching said material in said second region in more than one direction to achieve biaxial stretching and orientation of the material while the material in said first and third regions is substantially unoriented, whereafter the material is heated while being internally pressurized to effect thermal crystallization and release of internal stresses such that the first and third regions are in a thermocrystallized state and provide an opaque appearance while the second region has only a small crystallization to provide a transparent appearance, whereby the container is form stable when reheated.

2. A form-retaining container as claimed in claim 1 wherein said bottom is inwardly bulged into the container.

3. A container as claimed in claim 1 wherein said polymer is polyethylene terephthalate.

4. A container as claimed in claim 1 wherein said neck is relatively narrow in said first region, said body is relatively wide in said second region and said central portion protrudes inwardly into the container in said third region.

5. A form-retaining container made of a thermoplastic polymer material selected from the group consisting of polyethylene terephthalate, polyhexamethylene adipamide, polycaprolactam, polyhexamethylene sevacamide, polyethylene 2,6 and 1,5 naptthalate, polyetramethylene-1,2-dioxybenzoate, and copolymers of ethylene terephthalate and ethylene isophthalate; said container comprising in succession a mouth, a neck, a main body portion, and a bottom, said container having a first region inclusive of said mouth and part of said neck and a second region inclusive of the remainder of said neck and said main body portion, said polymer material being selectively heated, inflated and cooled so that said second region is obtained by stretching said material in said second region in more than one direction to achieve biaxial stretching and orientation of the material while the material in said first region is substantially unoriented, whereafter at least the material in said first region is heated while being internally pressurized to effect thermal crystallization and release of internal stresses such that said first region is in a thermocrystallized state and provides an opaque appearance while the second region has only a small thermocrystallization to provide a transparent appearance, whereby the container is form stable when reheated.

6. A form-retaining container as claimed in claim 5 wherein said bottom is inwardly bulged into the container.

7. A container as claimed in claim 5 wherein said polymer is polyethylene terephthalate.

8. A container as claimed in claim 5 wherein said neck is relatively narrow in said first region and said body is relatively wide in said second region, said container further comprising a third bottom region including a central portion which protrudes inwardly into the container.

* * * * *